United States Patent Office 3,406,732
Patented Oct. 22, 1968

3,406,732
PROCESS FOR MANUFACTURING AND RETREAD-
ING TIRES AND ARTICLES AND THE PRODUCTS
OBTAINED THEREFROM
Mario Milano, Ferrara, and Sandro Giovanardi, Forli,
Italy, assignors to Montecatini Edison S.p.A., Milan,
Italy, a corporation of Italy
No Drawing. Filed Mar. 11, 1964, Ser. No. 351,207
Claims priority, application Italy, Mar. 12, 1963,
5,171/63
19 Claims. (Cl. 152—330)

ABSTRACT OF THE DISCLOSURE

Manufacturing and retreading tires by covulcanizing a tread portion consisting essentially of a saturated olefin copolymer consisting of ethylene and a higher alpha-olefin, which tread portions contains vulcanizing agent consisting essentially of at least 5% by weight of olefin copolymer of an organic peroxide and at least 2 gram atoms of sulfur per active peroxide group of said organic peroxide, directly on to a carcass of natural or synthetic unsaturated rubber at a temperature of at least about 165° C. Tires so produced have high adhesion between tread and carcass portion.

---

This invention is directed to the manufacturing and retreading of tires comprising a structure wherein the carcass consists essentially of natural or a synthetic rubber and the tread portion consists essentially of a saturated olefin copolymer. Still more specifically, this invention is directed to a process for manufacturing and retreading tires wherein the carcass is either a natural or synthetic unsaturated rubber and the tread consists essentially of a saturated ethylene-alphaolefin copolymer. The invention is further characterized in that the adhesion between the carcass and the tread is accomplished by co-vulcanizing the different rubbers in the presence of an organic peroxide and an effective amount of sulfur. Still more specifically, this invention is directed to a process and to the product obtained therefrom which comprises co-vulcanizing the saturated olefin copolymer with a natural or synthetic unsaturated rubber at temperatures of at least 165° C.

With continuous progress in modern touring and transportation motor vehicles, exceptional performance is being required of the motor vehicle tires, particularly because of the high speed at which they are being used. Thus, because of high speeds and other obvious reasons, the motor vehicle rubber tire must be capable of withstanding various conditions such as resistance to ageing and, more particularly, resistance to ageing due to oxidation. Prolonged oxidation causes the rubber to crack and eventually form cuts. Likewise, the rubber tire should have a high resistance to abrasion, good hysteresis characteristics and adequate adhesion to the ground.

It is a known fact that natural rubber, which was one of the first elastomers used in the manufacture of tires, has very good characteristics, in general, but, more particularly, the lowest elastic hysteresis of any of the commercial rubbers. Even though natural rubber is superior in many respects, it is known to have a low resistance to abrasion and a poor resistance to ageing, particularly ageing caused by ozone. The abrasion resistance can, however, be improved by using suitable fillers. Because of the various disadvantages, there have been attempts to replace natural rubber completely or partially with synthetic rubbers which have substantially improved characteristics. These synthetic rubbers include, for example, SBR rubber, butyl rubber, etc.

Recently, new polymerization processes have been developed which have led to the synthesis of elastomers characterized as having a high degree of saturation and, therefore, a high resistance to oxidation. These synthetic elastomers include copolymers of ethylene and propylene or butene which can be obtained by copolymerizing mixtures of the monomers in the presence of a particular catalytic system. The catalytic system is obtained by reacting a transition metal compound such as a vanadium compound with an organometallic compound, e.g. an aluminum trialkyl or an aluminum alkyl halide. It is known that the ethylene-alphaolefin copolymers can be vulcanized with a peroxide acting as a generator of free-radicals in the presence of a free-radical acceptor such as sulfur. One method of vulcanization requires temperatures of about 165° C. with the use of a sulfur/peroxide ratio of 0.3 to 1.5 gram atoms of sulfur per each active peroxide group in the peroxide. The peroxide can be used in amounts ranging from 0.5 to 10 parts by weight per 100 parts of copolymer or in an amount of 0.5 to 10%.

These copolymers and their vulcanized products are characterized as having very good mechanical properties, excellent resistance to ageing and abrasion, and a low elastic hysteresis which, however, is higher than that of natural rubber. It is these characteristics that make the copolymer useful for various applications, such as for the manufacture of technical articles, insulated cables, tubes, tapes, foils, etc. More important, these copolymers are suitable for the production of tire treads which have characteristics substantially better than those of commercial rubber. It is also possible to use these copolymers for the entire manufacture of tires. These tires may not, however, have mechanical properties which are entirely satisfactory, but can be remarkably improved by simply extending them with oil, particularly an oil of the paraffinic type. It has been found, however, that in spite of the outstanding characteristics of these copolymers, it is preferred to use a natural or synthetic rubber for the carcass since these rubbers have a particularly low hysteresis and can withstand flexures normally required of the side walls and carcass.

Consequently, it would be highly desirable to manufacture or retread tires comprising a carcass of natural or synthetic rubber and tread of an ethylene-alphaolefin copolymer. This combination of natural rubber and copolymer will thus provide an undeniable improvement over tires prepared heretofore, in that all the desirable characteristics of the natural rubber and copolymer are contained in a single product. Heretofore, it had been difficult, if not impossible, to manufacture tires from these two different types of elastomers, since they are not very compatible with each other. Consequently, until this invention, it was not possible to join layers of these two elastomers during vulcanization to obtain a good product. One means of solving the problem comprised interposing between the two layers of elastomers a third layer consisting essentially of a chemically-modified ethylene-alphaolefin copolymer. This chemically-modified third layer was made to be physically and chemically compatible with both of the non-compatible elastomers and their respective vulcanization systems. More specifically, a chlorosulfonated ethylene-alphaolefin copolymer was used as the chemically modified third layer. While this approach avoided some of the problems, it presented other complications including higher costs.

It was discovered, quite unexpectedly, that tires could be manufactured with a carcass of natural or unsaturated synthetic rubber and a tread portion of a saturated alpha-olefin copolymer. It was necessary, however, that the two rubbers be co-vulcanized in the presence of sulfur and an organic peroxide. Vulcanization in the presence of a peroxide and sulfur permitted direct adhesion between the two different elastomers without requiring the need of an interposing third or auxiliary layer.

Accordingly, it is an object of this invention to provide a process which will enable the manufacture of tires and tire treads comprising either a natural or unsaturated synthetic rubber carcass and a saturated ethylene-alphaolefin copolymer tread.

It is a further object of this invention to provide a means of utilizing all of the advantages of natural rubber as the tire carcass and the superior characteristics of an ethylene-alphaolefin copolymer as the tire treads.

It is still a further object of this invention to provide tires and a process for preparing tires characterized as having a mixed structure comprising a carcass of natural or unsaturated synthetic rubber and tread of a saturated olefin copolymer attached directly to said carcass by means of a co-vulcanization process.

These and other objects of the invention will become apparent from the further and more detailed description which follows.

It has been found, quite unexpectedly, that these and other objects of the invention can be accomplished by using a particular recipe for the vulcanization of the two different rubbers. It was discovered that, by using a certain vulcanization mix, it was possible to obtain perfect compatibility and adhesion between the layer of natural rubber and the layer of copolymer without significantly impairing the mechanical characteristics of the latter. This vulcanization mix comprises a combination of sulfur and an organic peroxide. More particularly, it has been found that the peroxide must be used in an amount of at least 5 parts by weight per 100 parts by weight of the olefin copolymer, with the sulfur being present in an amount of at least 2 gram atoms per each active peroxide group. Co-vulcanization of the two types of rubbers at temperatures of at least 165° C. resulted in complete adhesion of the copolymer layer with the layer of natural or synthetic rubber. The latter may contain its own vulcanizing agent. More specifically, the process of manufacturing or retreading tires of mixed structures, in accordance with this invention, can be further characterized in that the adhesion between the two layers of different rubbers is accomplished by utilizing in combination with the olefin copolymer a specific vulcanizing mix. The olefin copolymer which is directly in contact with the natural or synthetic rubber must contain a peroxide in an amount not less than 5 parts per 100 parts by weight of copolymer. Sulfur is present with the peroxide and olefin copolymer in an amount of at least a sulfur to peroxide ratio of 2 gram atoms of sulfur per each active peroxide group. The vulcanization should be carried out at a temperature higher than 165–170° C. and more preferably at a temperature ranging from about 170° C. to 200° C. The vulcanization time may range over a period of about 30 minutes.

Particular improvements can be obtained in accordance with this invention by using a synthetic diene rubber in place of the natural rubber. The synthetic diene rubbers include styrene-butadiene copolymers, polybutadiene, cis-1,4-polybutadiene, cis-1,4-polyisoprene, butyl rubber, nitrile rubber, etc. The use of natural rubber, however, may be preferred in many instances for the aforementioned reasons.

In manufacturing tires, it is possible to apply the process of this invention directly to the two layers to be coupled by adding the required amount of peroxide and sulfur to the whole amount of the ethylene-alphaolefin copolymer. However, in order to minimize the amount of vulcanizing agent required, it is preferred to use an alternative method to obtain adhesion between the two layers of rubbers. Thus, for example, it is desirable to use a diene rubber layer which may or may not be reinforced and a thin sheet of olefin copolymer which contains a rich mixture of peroxide and sulfur. The thin sheet of olefin copolymer containing a rich mixture of the vulcanizing agents is then vulcanized directly onto the tread portion also comprising an olefin copolymer. The olefin copolymer forming the entire tread portion obviously has a lower amount of vulcanizing agent than the thin sheet of copolymer. The thin sheet is also vulcanized to the rubber carcass. In other words, the thin sheet containing a rich mixture is attached directly to the diene rubber carcass on one side and the treaded portion of olefin copolymer on the other side. It is obvious that by using the thin sheet of olefin copolymer with a rich mixture of the vulcanizing agent it is possible to reduce the amount of vulcanizing agent required.

As another alternative, in the manufacture and retreading of tires it may be convenient to interpose between the carcass of synthetic rubber, e.g. diene rubber, and the tread of olefin copolymer a thin sheet referred to as A–B. Sheet A–B consists of two joined layers wherein layer A is a diene rubber and layer B is a saturated olefin copolymer containing a peroxide and sulfur in accordance with this invention. The thin sheet is applied with layer A comprising the diene rubber in direct contact with the carcass which also comprises diene rubber. The tread portion comprising an olefin copolymer is attached directly to layer B which is the same copolymer containing a rich mixture of peroxide and sulfur. Vulcanization of the assembled tire, either manufactured or retreaded, is carried out in a suitable mold for about 30 minutes at a temperature of at least 165–170° C. and as high as 200° C.

The olefin copolymers referred to for purposes of this invention include copolymers of ethylene and propylene, butene or other alphaolefins obtained according to known processes. These olefins copolymers may have an ethylene content ranging from about 20 to 80% by mols, a molecular weight ranging from about 80,000 to 800,000 and a Mooney plasticity ML(1+4) at 100° C. of about 20 to 80.

As the vulcanizing agents, for purposes of this invention, the organic peroxides include such compounds as the hydroperoxides, peroxides, peresters, perketals, peracetals, etc. These peroxides are used together with sulfur as a free-radical acceptor. The amount of peroxide to be used in combination with the olefin copolymer, which is to be in direct contact with natural or synthetic rubbers, i.e. diene rubbers, ranges from about 5 to 20 parts by weight per 100 parts by weight of the copolymer. The sulfur used as the free-radical acceptor is added in an amount of at least 1.2 parts per 100 parts of olefin copolymer. The exact amount of sulfur to be used will be determined so as to have at least 2 gram atoms of sulfur per active peroxide group in the peroxide.

The rubber mixtures comprising a diene rubber, for example, and an olefin copolymer may contain reinforcing fillers in amounts ranging from 30 to 200% by weight. These fillers are the types normally used in rubber and include materials such as carbon black, silica, clay, kaolin, etc. In addition, various other additives and accelerants may be used in combination with the rubbers. The mixtures can be prepared not only with the pure rubbers but with oil-extended rubbers which allow a reduction in cost. In addition, the oil-extended rubbers not only reduce the cost, but also improve the work ability and in some aspects improve many of the characteristics. It should be noted, however, that in utilizing a diene rubber it is preferred to use aromatic oils, whereas for the olefin copolymers it is preferred to use paraffinic oils which do not interfere with the peroxidic vulcanization. The amount of oil may range from about 2 to 100% by weight of the elastomers.

The following examples illustrate the invention without limiting its scope.

Example 1

A tire was manufactured which had a carcass made of natural rubber and the tread of an ethylene-propylene copolymer. The composition of the tread was as follows:

COMPOSITION A

| | Parts by weight |
|---|---|
| Ethylene-propylene copolymer ML 60 (ethylene 50%) | 75 |
| Oil FL 65 (paraffinic) | 25 |
| Carbon black HAF | 50 |
| Sulfur | 0.6 |
| 100% dicumyl peroxide | 5 |

The characteristics of the oil FL 65 are:

| | |
|---|---|
| Viscosity at 100° C. centistokes | 4 |
| Density at 20° C. | 0.86 |
| Constant gravity-viscosity V.G.C. | 0.80 |

The composition of the carcass was as follows:

COMPOSITION B

| | Parts by weight |
|---|---|
| Natural rubber | 100 |
| ZnO | 5 |
| Carbon black HAF | 50 |
| Santocure (cyclohexyl-benzothiazyl-sulfonamide) | 1.2 |
| Sulfur | 2.5 |

The adhesion between the natural rubber carcass and the ethylene propylene copolymer treads was carried out by means of a thin sheet comprising the following compositions:

COMPOSITION C

| | Parts by weight |
|---|---|
| Ethylene-propylene copolymer ML 25 (50% ethylene) | 100 |
| Carbon black HAF | 50 |
| Sulfur | 2.4 |
| 40% dicumyl peroxide in calcium carbonate | 25 |

The rubber tire components were assembled and then vulcanized in a suitable mold at a temperature of about 170° C. for about 30 minutes. No problems were observed during the assembling, shaping and molding of the tire. The tire was tested on a road-wheel until breaking. There were no signs of the different layers of rubbers becoming detached.

Example 2

Several 5.20 x 14 commercial tires were rasped and then coated with a thin sheet consisting of two joined layers D and E having the following compositions:

COMPOSITION D

| | Parts by weight |
|---|---|
| Natural rubber | 100 |
| ZnO | 5 |
| Durosil | 50 |
| Diphenylguanidine | 0.5 |
| Santocure (cyclohexyl-benzothiazyl-sulfonamide) | 1.2 |
| Sulfur | 2.5 |

COMPOSITION E

| | Parts by weight |
|---|---|
| Ethylene-propylene copolymer ML 25 (50% ethylene) | 100 |
| Carbon black HAF | 50 |
| Sulfur | 2.4 |
| 40% dicumyl peroxide in calcium carbonate | 25 |

The thin sheets D and E were applied with layer D in contact with the carcass. The tread composition was applied directly to layer E and consist essentially of an ethylene-propylene copolymer and having the same composition as A of Example 1. The tires were assembled and then vulcanized in a suitable mold at a temperature of about 170° C. for about 30 minutes. These retreaded tires were mounted on the rear wheels of an automobile and road tested. During the test, there were no signs of any breaking between the carcass and the tread with the use of thin sheets D and E as the intermediate.

Example 3.—Peeling tests at different temperatures

Adhesion values obtained from compositions of an ethylene-propylene copolymer F and a natural rubber G according to this invention were compared with the corresponding values obtained from natural rubber H and GRS rubber I. The values were obtained from the following compositions F, G and H.

COMPOSITION F.—(ADHESIVE COMPOSITION FOR USE WITH NATURAL RUBBER COMPRISING AN ETHYLENE-PROPYLENE COPOLYMER)

| | Parts by weight |
|---|---|
| Ethylene-propylene copolymer ML 20 (50% ethylene) | 100 |
| ISAF black | 50 |
| Sulfur | 2.5 |
| 40% dicumyl peroxide | 25 |

COMPOSITION G.—(ADHESIVE COMPOSITION FOR USE WITH AN ETHYLENE-PROPYLENE COPOLYMER COMPRISING NATURAL RUBBER)

| | Parts by weight |
|---|---|
| Natural rubber | 100 |
| 2,2,4,6-2,2')-methylene bis(4-methyl - 6 - tert.butylphenol) | 1 |
| Durosil | 50 |
| ZnO | 5 |
| Diphenylguanidine | 0.5 |
| Santocure | 1.2 |
| Sulfur | 2.5 |

COMPOSITION H.—(NORMAL MIXTURE COMPRISING NATURAL RUBBER)

| | Parts by weight |
|---|---|
| Natural rubber | 100 |
| 2,2,4,6(2,2')-methylene bis(4-methyl-6-tert. butylphenol) | 1 |
| SRF black | 30 |
| ZnO | 5 |
| Stearic acid | 3 |
| Diphenylguanidine | 0.5 |
| Santocure | 1.2 |
| Sulfur | 2.0 |

COMPOSITION I.—(NORMAL MIXTURE OF G.R.S. RUBBER)

| | Parts by weight |
|---|---|
| G.R.S. type 1500 | 100 |
| 2,2,4,6(2,2)-methylene bis(4-methyl-6-tert. butylphenol) | 1 |
| Carbon black HAF | 50 |
| ZnO | 3 |
| Stearic acid | 2 |
| Mercaptobenzothiazoldisulfide | 1 |
| Sulfur | 1.75 |

Two specimens corresponding to compositions F and G were treated (on the surfaces to be contacted) with solutions of composition G in heptane and then molded together at 165° C. for 30 minutes. The surfaces of the two specimens corresponding to compositions H and I, which were to be contacted, were also washed with heptane. The H and I specimens were vulcanized together at 150° C. for 40 minutes. The peeling values (ASTM D 413-39) obtained from specimen compositions F–G and G–H at various temperatures are reported in the following table:

TABLE I

| Temperature, ° C. | Peeling values (kg./cm.) | |
|---|---|---|
| | F-G | H-I |
| 20 | About 20 | 25 |
| 50 | 16 | 20 |
| 70 | 16 | 16 |
| 90 | 16 | 15 |

While this invention has been described with respect to a number of specific embodiments, it is obvious that there are many other modifications and variations which can be made without departing from the spirit of the invention, except as more particularly pointed out in the appended claims.

We claim:
1. A process for manufacturing and retreading tires by co-vulcanizing different rubbers which comprises co-vulcanizing a tread portion consisting essentially of a saturated olefin copolymer consisting entirely of ethylene and a higher alpha-olefin, said copolymer having an ethylene molar content ranging from about 20–80% and a molecular weight ranging from 80,000 to 800,000, which portion contains an effective amount of a vulcanizing agent, directly onto a carcass at a temperature of at least 165° C.; said carcass being selected from the group consisting of natural rubber and synthetic unsaturated rubbers; said vulcanizing agent consisting essentially of a combination of at least 5% by weight of said copolymer of an organic peroxide and at least 2 gram atoms of sulfur per active peroxide group of said organic peroxide, whereby a strong bond is achieved between said tread portion and said carcass so as to prevent the tread from separating from the carcass in normal tire use.

2. The process of claim 1 wherein co-vulcanization takes place at a temperature ranging from about 170° C. to 200° C.

3. The process of claim 1 wherein the peroxide is present in an amount ranging from about 5–20% by weight and the sulfur is present in an amount of at least 1.2% by weight of the olefin copolymer.

4. The process of claim 3 wherein the synthetic unsaturated rubber is a diene rubber.

5. The process of claim 1 wherein the peroxide and sulfur are uniformly distributed in the olefin copolymer.

6. The process of claim 1 wherein said tire carcass consists essentially of an unsaturated synthetic rubber and is co-vulcanized directly onto one side of an intermediate layer consisting essentially of said saturated olefin copolymer which contains at least 5% by weight of an organic peroxide and at least 2 gram atoms of sulfur per active peroxide group; said remaining side of the intermediate layer of copolymer being co-vulcanized directly onto a tread portion consisting essentially of a saturated olefin copolymer containing from about 0.5–10% by weight of an organic peroxide and at least 1 gram atom of sulfur per active peroxide group; said co-vulcanization of the carcass, intermediate layer, and tread portion taking place at a temperature ranging from about 165° C.–200° C.

7. The process of claim 4 wherein the saturated olefin copolymer is an ethylene-propylene copolymer.

8. The process of claim 1 wherein said carcass is natural or synthetic unsaturated-rubber and is co-vulcanized directly onto one side of an intermediate-integral sheet; said intermediate-integral sheet comprising a layer of diene rubber and a layer of said saturated olefin copolymer; said saturated olefin copolymer layer containing at least 5% by weight of an organic peroxide and at least 2 gram atoms of sulfur per active peroxidic group; said layer of diene rubber of the intermediate sheet being co-vulcanized directly onto the rubber tire carcass and said layer of saturated olefin copolymer of the sheet being co-vulcanized directly onto the olefin copolymer tread portion; said co-vulcanization taking place at a temperature ranging from at least 165° C. to 200° C.

9. The process of claim 8 wherein the rubber tire carcass is a diene rubber.

10. The process of claim 8 wherein the saturated olefin copolymer layer of the intermediate sheet contains 5–20% by weight of the organic peroxide and at least 1.2% by weight of sulfur.

11. The process of claim 1 for retreading a carcass of a used commercial natural or synthetic rubber tire wherein said carcass is rasped and co-vulcanized with an intermediate integral sheet and with a tread portion consisting essentially of said olefin copolymer at a temperature ranging from at least 165° C. to 200° C.; said intermediate-integral sheet comprising a layer of diene rubber and a layer of said saturated olefin copolymer; said layer of saturated-olefin copolymer of the sheet containing at least 5% by weight of an organic peroxide and at least 2 gram atoms of sulfur per active peroxide group; said layer of diene rubber of the intermediate sheet being co-vulcanized directly onto the rubber tire carcass and the layer of olefin copolymer being co-vulcanized directly onto the olefin copolymer tread portion; said olefin copolymer tread portion containing from about 0.5% to 10% by weight of an organic peroxide and at least 1 gram atom of sulfur per active peroxide group in the peroxide.

12. The process of claim 11 wherein the olefin copolymer layer of the intermediate sheet contains 5–20% by weight of an organic peroxide.

13. The process of claim 1 wherein said organic peroxide is a hydroperoxide, a perester, a perketal or a peracetal.

14. The process of claim 1 wherein said synthetic unsaturated rubber is a styrene-butadiene copolymer, polybutadiene, polybutadiene-1,4-cis, polyisoprene-1,4-cis, butyl rubber or nitrile rubber.

15. The process of claim 1 wherein the synthetic unsaturated rubber of the carcass and the saturated olefin copolymer of the tread contain effective amounts of reinforcing fillers.

16. The process of claim 15 wherein the reinforcing filler is carbon black.

17. The process of claim 1 wherein the synthetic unsaturated rubber and the natural rubbers of the carcass and the saturated olefinic copolymers of the tread contain effective amounts of a petroleum oil.

18. A new rubber tire obtained by the process of claim 1 and wherein the co-vulcanized carcass and tread portions have a resistance to peeling of at least 14 kg./cm. at a temperature of 70° C.–90° C.

19. A retreaded tire obtained by the process of claim 11.

References Cited
UNITED STATES PATENTS

| | | | |
|---|---|---|---|
| 3,000,866 | 9/1961 | Tarney | 260—80.5 |
| 3,058,859 | 10/1962 | Amberg | 156—96 X |
| 3,136,739 | 6/1964 | Adamek et al. | 152—330 X |
| 3,228,793 | 1/1966 | Stemmer et al. | 117—161 |
| 3,241,592 | 3/1966 | Sheary | 152—330 |

FOREIGN PATENTS

| | | |
|---|---|---|
| 865,806 | 4/1961 | Great Britain. |
| 838,963 | 6/1960 | Great Britain. |

EARL M. BERGERT, *Primary Examiner.*

CLIFTON B. COSBY, *Assistant Examiner.*